United States Patent
Berger et al.

(10) Patent No.: US 10,082,108 B2
(45) Date of Patent: Sep. 25, 2018

(54) FUEL INJECTOR FOR OPERATION WITH COMBUSTIBLE GAS

(71) Applicant: L'ORANGE GMBH, Stuttgart (DE)

(72) Inventors: Ingmar Joachim Berger, Stuttgart (DE); Markus Kalenborn, Dornstadt (DE)

(73) Assignee: L'Orange GMBH, Stuttgart (DE)

( * ) Notice: Subject to any disclaimer, the term of this patent is extended or adjusted under 35 U.S.C. 154(b) by 0 days.

(21) Appl. No.: 15/545,452

(22) PCT Filed: Jan. 7, 2016

(86) PCT No.: PCT/EP2016/000018
§ 371 (c)(1),
(2) Date: Jul. 21, 2017

(87) PCT Pub. No.: WO2016/119993
PCT Pub. Date: Aug. 4, 2016

(65) Prior Publication Data
US 2018/0003131 A1  Jan. 4, 2018

(30) Foreign Application Priority Data

Jan. 31, 2015 (DE) .................. 10 2015 001 199

(51) Int. Cl.
| | | |
|---|---|---|
| F02B 3/00 | (2006.01) | |
| F02M 21/02 | (2006.01) | |
| F02M 43/04 | (2006.01) | |

(52) U.S. Cl.
CPC .... *F02M 21/0263* (2013.01); *F02M 21/0275* (2013.01); *F02M 21/0284* (2013.01); *F02M 43/04* (2013.01)

(58) Field of Classification Search
CPC .. F02D 41/40; F02B 2023/103; F02B 23/104; F02M 61/1813; F02M 61/182;
(Continued)

(56) References Cited

U.S. PATENT DOCUMENTS

| | | |
|---|---|---|
| 2,166,216 A | 1/1940 | Smith |
| 4,499,862 A | 2/1985 | Baumer et al. |
| | (Continued) | |

FOREIGN PATENT DOCUMENTS

| | | |
|---|---|---|
| DE | 19907897 A1 | 8/2000 |
| DE | 10247958 A1 | 4/2004 |
| | (Continued) | |

*Primary Examiner* — John Kwon
(74) *Attorney, Agent, or Firm* — Fish & Richardson P.C.

(57) ABSTRACT

A fuel injector for operation with combustible gas, having a gas nozzle assembly having at least one gas nozzle opening, and at least one gas nozzle needle associated with the gas nozzle assembly and accommodated in an axial holder so that the stroke of the gas nozzle needle can be controlled. Each gas nozzle opening leads out of the holder having a radial direction component at the nozzle end. The fuel injector has, in the holder, a needle seat upstream of the particular nozzle opening, which needle seat is provided for selectively blocking a combustible-gas flow path to the associated gas nozzle opening in interaction with the gas nozzle needle. The gas nozzle openings are distributed over part of the circumference in the circumferential direction of the gas nozzle needle. The holder, adjoining the needle seat and extending away therefrom axially in the upstream direction, is asymmetric with respect to an axial center axis through the gas nozzle needle. The asymmetry results from a cross-section expansion of the holder on a side of the holder that lies radially opposite the gas nozzle opening, such that a greater mass flow rate of combustible gas can be conducted in the holder by the crosssection expansion than on the gas nozzle opening side opposite thereto. The holder is also shaped to apply a flow direction oriented toward the radially opposite gas nozzle opening, already upstream of the needle seat and via the cross-section expansion, to a combustible-gas flow guided to the needle seat by the cross-section expansion.

15 Claims, 3 Drawing Sheets

(58) Field of Classification Search
CPC .............. F02M 61/1833; B05B 1/3013; B05B 1/3006; B05B 1/3046
USPC .............. 123/294, 296, 299, 305, 445, 478; 239/569, 583, 584, 581.1, 585.1, 446
See application file for complete search history.

(56) References Cited

U.S. PATENT DOCUMENTS

| | | | | |
|---|---|---|---|---|
| 5,522,760 | A * | 6/1996 | Patel | B24C 1/083 451/102 |
| 6,206,304 | B1 * | 3/2001 | Koseki | F02M 51/0671 239/533.12 |
| 6,494,388 | B1 | 12/2002 | Mueller et al. | |
| 6,776,358 | B2 * | 8/2004 | Arimoto | F02M 61/042 239/533.3 |
| 6,845,925 | B2 * | 1/2005 | Abe | F02M 51/061 239/533.12 |
| 6,948,665 | B2 * | 9/2005 | Joseph | F02M 51/0671 239/533.2 |
| 6,964,383 | B2 * | 11/2005 | Heyse | F02M 51/0671 239/533.12 |
| 7,021,274 | B2 * | 4/2006 | Nakayama | F02B 17/005 123/294 |
| 7,086,615 | B2 * | 8/2006 | Joseph | F02M 61/168 239/533.12 |
| 7,188,790 | B2 * | 3/2007 | Astachow | F02M 61/1806 239/533.15 |
| 7,364,099 | B2 | 4/2008 | Boecking | |
| 7,942,349 | B1 * | 5/2011 | Meyer | F02M 61/08 123/294 |
| 8,646,704 | B2 * | 2/2014 | Yamamoto | F02M 51/0675 239/533.9 |
| 9,303,610 | B2 | 4/2016 | Jay | |
| 2013/0112780 | A1 | 5/2013 | Jung et al. | |
| 2014/0091159 | A1 | 4/2014 | Brown et al. | |
| 2016/0319754 | A1 | 11/2016 | Kalenborn | |

FOREIGN PATENT DOCUMENTS

| | | |
|---|---|---|
| DE | 102012107804 A1 | 5/2013 |
| DE | 102013022260 B3 | 5/2015 |
| GB | 2007763 A | 5/1979 |
| WO | 2012072881 A1 | 6/2012 |

* cited by examiner

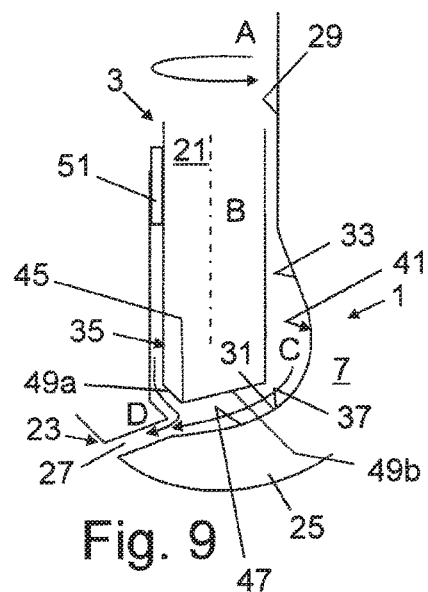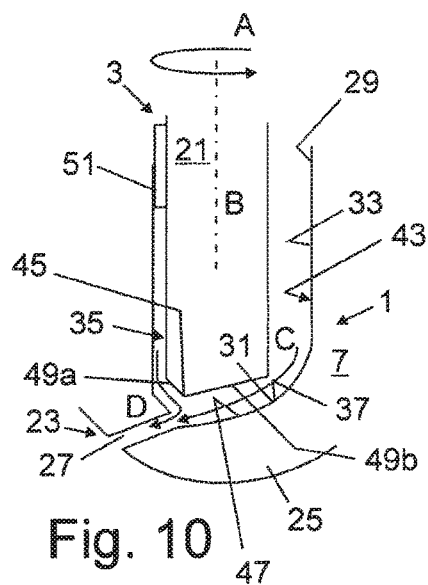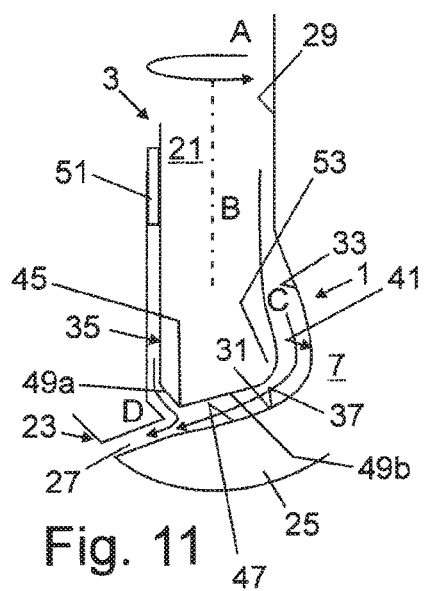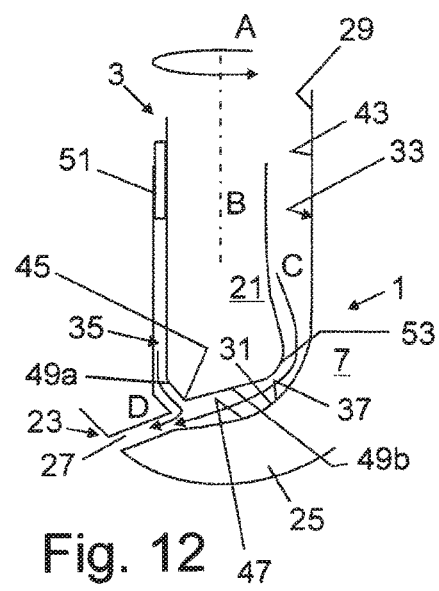

FUEL INJECTOR FOR OPERATION WITH COMBUSTIBLE GAS

The present application is a 371 of International application PCT/EP2016/000018, filed Jan. 7, 2016, which claims priority of DE 10 2015 001 199.5, filed Jan. 31, 2015, the priority of these applications is hereby claimed and these applications are incorporated herein by reference.

BACKGROUND OF THE INVENTION

The present invention concerns a fuel injector for operation with combustible gas. The fuel injector may in particular be formed as a dual-fuel injector.

Gaseous fuels are increasingly gaining importance in the (large) engine sector, in particular in stationary engines for power generation. Natural gas for example, because of its excellent availability and favorable emission potential in comparison with diesel fuel, is ideally suited for economic and environmentally friendly engine operation.

In fuel injectors which are formed as multiple substance injectors or dual-fuel injectors, and as well as the gas injector part also comprise a liquid fuel injector part, in particular for an ignition jet operation, the gas nozzle openings of the fuel injector are often not distributed over the complete circumference of the fuel injector, see for example publication US 2014/0091159 A1. Especially in injectors which have several gas nozzle needles arranged for example around one central liquid-fuel nozzle needle, often a gas nozzle assembly is assigned to a gas nozzle needle; in this assembly, the gas nozzle openings radially cover only a part of 360°, for example in the case of four gas nozzle needles, each covers 90°.

However, such fuel injectors, the nozzle needles of which are received as standard in respective rotationally symmetrical bores, entail the disadvantage that flow losses of combustible gas occur because of the asymmetric flow around the needle seat.

SUMMARY OF THE INVENTION

In this context, the present invention is based on the object of proposing a fuel injector of the type cited initially which helps minimize such combustible gas flow losses.

According to the invention, a fuel injector is proposed for operation with combustible gas, wherein the fuel injector is preferably provided as a multi-substance, in particular a dual-fuel, injector. However, an embodiment as a single-fuel injector is also conceivable. Preferably, the fuel injector is provided for an ignition jet operation (liquid fuel ignition jet (pilot injection) to ignite the gaseous fuel), in particular also for a purely liquid fuel operation (exclusively with liquid fuel). The fuel injector may advantageously be used with a large engine, in particular with a common rail fuel injection system, for example in a motor vehicle such as a heavy goods vehicle, another type of commercial vehicle, a ship, a locomotive, wherein also the arrangement may be provided for a stationary device, e.g. for a combined heat and power plant, an (emergency) electricity generator, e.g. also for industrial applications.

In the case of operation with combustible gas, for example natural gas, biogas, landfill gas, hydrogen or a similar combustible gas may be provided for use with the fuel injector.

The fuel injector comprises, at a nozzle end, a gas nozzle assembly having at least one gas nozzle opening (spray hole). The gas nozzle assembly may comprise for example 1 to 3 gas nozzle openings, or a different number thereof. The fuel injector furthermore comprises at least one nozzle needle which is assigned to the gas nozzle assembly and is accommodated in an axial holder (e.g. a bore) of the fuel injector, preferably formed in a nozzle body thereof, such that its stroke can be controlled, wherein each gas nozzle opening leads out of the holder at the nozzle end with a radial direction component, i.e. for emitting combustible gas into a combustion chamber.

Also in the holder, a needle seat is formed upstream of or above (further away from the nozzle) the respective gas nozzle opening, which needle seat is provided for selectively blocking, in cooperation with the gas nozzle needle, a combustible gas flow path to the respective gas nozzle opening. Preferably, the needle seat is formed as a conical seat or chamfered seat, i.e. with an annular, oblique or conical seat face. For selective opening control of the gas nozzle needle, the injector may preferably be controlled indirectly, i.e. following the principle of actuator, pilot valve, control chamber. However, a direct control of the gas nozzle needle is also conceivable.

In the fuel injector corresponding to the embodiment outlined initially, the one or more gas nozzle openings are distributed merely over part of the circumference in the circumferential direction of the gas nozzle needle. For example, an arrangement of the nozzle openings is proposed in an angular range of 90° in the circumferential direction.

In a fuel injector configured in the sense of the invention with four such 90° nozzle assemblies and respective assigned gas nozzle needles, a 360° range can thus be covered in the context of combustible gas emission, e.g. in the context of an arrangement around a central liquid fuel nozzle needle. Alternatively, for example, the nozzle openings of the nozzle assembly may be arranged in a partially circumferential angular range of approximately 180°. Configured in the sense of the invention, a fuel injector for a 360° coverage of a combustion chamber consequently has two such 180° nozzle assemblies, each with a gas needle nozzle, for example each next to a central liquid fuel nozzle needle.

The fuel injector according to the invention is characterized in that the holder adjoining the needle seat and extending axially away therefrom in the upstream direction, is formed asymmetrically with respect to an axial center axis through the gas nozzle needle, wherein the asymmetry results from a cross-section widening of the holder on a side of the holder lying radially opposite the at least one gas nozzle opening, such that by means of the cross-section widening, a greater mass flow of combustible gas can be guided in the holder than on the gas nozzle opening side radially opposite thereto. Characteristically, the holder here is also configured to apply a flow direction oriented towards the radially opposite at least one gas nozzle opening, already upstream of the needle seat and by means of the cross-section widening, to a combustible gas flow guided to the needle seat by the cross-section widening, i.e. in particular by means of a suitably formed outlet end of the cross-section widening.

Advantageously, with this embodiment of the fuel injector in which the holder (needle guide) is not rotationally symmetrical, firstly a greater cross-section may be made available for the combustible gas flow opposite the nozzle openings, and hence the flow losses can be significantly reduced. Furthermore, with the cross-section widening configured according to the invention, it is also possible to guide this relatively higher mass flow to the opposite nozzle openings in a streamlined fashion because of the applied flow direction. As a result, for a given nozzle size and injection duration, advantageously more gas can be introduced into a combustion chamber with associated higher engine power.

In a refinement of the invention, in particular it is provided that the holder is configured to guide a combustible gas flow, which is conducted by the cross-section widening to the needle seat and over this to the at least one gas nozzle opening, along this flow path portion without stepped falls, in particular with the applied flow direction and further preferably with largely constant gradient or incline. Thus the needle seat may preferably form a chamfered seat face which continues the cross-section widening with the applied flow direction, and/or an inlet face of the needle seat adjoining the cross-section widening may align with an outlet face of the cross-section widening adjoining the needle seat. In this way, flow losses can be further minimized.

In addition, again associated with the advantage of further improved flow guidance, it may be provided that the holder is configured to guide combustible gas supplied by means of the cross-section widening, in particular with the applied flow direction, tangentially or axially parallel to its center axis, to the at least one gas nozzle opening, i.e. in particular into an inlet end thereof.

In order to achieve the effects according to the invention, it is provided in particular that the cross-section widening is formed as a bulge on the holder which extends from upstream to the valve seat, in particular as a dish-like cavity. Embodiments are also conceivable in which the holder forms at least one chute, in particular one chute per gas nozzle opening, which guides the combustible gas flow by means of the cross-section widening to the at least one gas nozzle opening, e.g. also partly defines the cross-section widening.

Furthermore, embodiments of the fuel injector are advantageous in which a nozzle-side end portion of the gas nozzle needle is formed asymmetrically in relation to the center axis of the gas nozzle needle. Here, a combustible gas flow, guided by means of the cross-section widening to the at least one gas nozzle opening, may be directed firstly by means of the asymmetrical end portion into the at least one gas nozzle opening in an inlet direction which again is preferably oriented tangentially to the gas nozzle opening, in particular tangentially to its upper end remote from the combustion chamber. This again helps to minimize flow losses further. Secondly, a gas nozzle needle configured in this way may cause a combustible gas flow, guided by means of the cross-section widening to the at least one gas nozzle opening, to be combined with a combustible gas flow guided on the gas nozzle opening side only immediately before the inlet end of the gas nozzle opening, which further reduces flow losses originating from non-laminar flow. A gas nozzle needle configured in this way may have a greater axial length adjacent to the at least one gas nozzle opening than at the side radially opposite thereto, and in between form a chamfered face which guides the combustible gas flow in particular substantially tangentially to the gas nozzle opening inlet end.

To further improve flow, it is also proposed that the gas nozzle needle be configured bulging. On the side radially opposite the at least one gas nozzle opening, the gas nozzle needle may have e.g. a flow-conductive molding and/or a bulge which is received in the cross-section widening or extends therein. By means of the molding or bulge, the combustible gas flow may be channeled and conducted in a streamlined fashion around the needle end close to the nozzle, and hence with improved pulse retention. The bulge on the needle may e.g. transform smoothly into a chamfered face, as described above, of a gas nozzle needle on the end face close to the nozzle.

In particular with embodiments of the invention in which—as explained above—the gas nozzle needle is formed asymmetrically for an improved flow guidance of the combustible gas, it is provided that the gas nozzle needle is held in the holder so as to be secure against twisting. For example, tong-and-groove securing components are conceivable for this.

It should also be noted that, in general, with the invention, it is preferred for the fuel injector to be configured so as to allow, on lifting of the gas nozzle needle away from the needle seat—at least in a full stroke position of the gas nozzle needle, preferably already in a partial stroke position—a line of sight or a sight channel from the outlet end of the cross-section widening to an inlet cross-section of the at least one gas nozzle opening arranged radially opposite thereto. With such an embodiment, a contact flow onto the gas nozzle opening by means of the cross-section widening becomes possible without the need for a flow-disruptive deflection of the combustible gas flow around the needle end of the gas nozzle needle.

The invention also proposes an internal combustion engine, wherein the internal combustion engine comprises at least one fuel injector of the type specified above.

Further features and advantages of the invention arise from the description below of exemplary embodiments of the invention, with reference to the figures of the drawings which show details essential to the invention, and from the claims. The individual features may be implemented alone or in any combination in a variant of the invention.

Preferred embodiments of the invention are explained in more detail below with reference to the enclosed drawings. In the drawings:

BRIEF DESCRIPTION OF THE DRAWING

FIG. 2 shows diagrammatically as an example a fuel injector according to FIG. 1 in a top view onto the nozzle-side portion in cross-section, wherein FIG. 2 illustrates a plurality of possible embodiments of the invention.

FIGS. 3-12 each show diagrammatically as an example a possible embodiment of a fuel injector with a combustible gas flow guidance according to the invention.

DETAILED DESCRIPTION OF THE INVENTION

Figure 1:
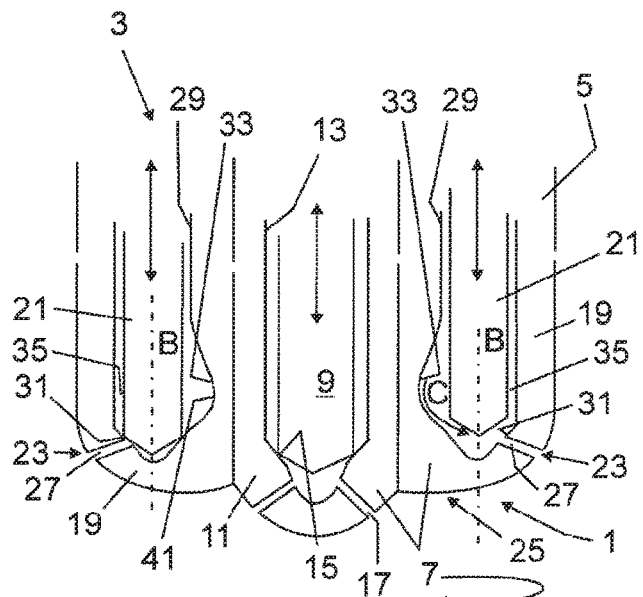
FIG. 1 shows diagrammatically as an example a nozzle-side end portion of a fuel injector according to a possible embodiment of the invention, in a cut-away cross-section view.

In the description which follows and in the drawings, the same reference signs correspond to elements with the same or equivalent function.

FIG. 1 shows diagrammatically as an example a nozzle-side end portion 1 of a fuel injector 3 according to the invention for operation with combustible gas, wherein the fuel injector 3 illustrated is provided as a dual-fuel injector, i.e. for operation both with liquid fuel and also with combustible gas. The liquid fuel for use with the fuel injector 3 may be diesel fuel, bio-oil, fuel oil or another type of liquid fuel, as combustible gas for use with the fuel injector 3, in particular natural gas, e.g. also biogas, landfill gas etc. may be used. The fuel injector 3 provided in this way is intended in particular for an ignition jet operation and also for example with a purely liquid fuel operation.

The fuel injector 3 has an injector housing 5 which is formed with a nozzle body 7, in the present case in particular by means of a modular or multipiece nozzle body 7. As FIG. 1 shows, a liquid fuel nozzle needle 9, axially displaceable in reciprocating motion, is received in a first module 11 or part of the nozzle body 7, i.e. in an axial bore 13 thereof. The liquid fuel nozzle needle 9 acts against a valve seat 15 which is provided at a nozzle-side end of the axial bore 13. On the nozzle-side end, spray holes 17 open from the first module 11 of the nozzle body 7 for the emission of liquid fuel (during injection processes), wherein the liquid fuel can be supplied to the spray holes 17, starting from an upstream portion of the axial bore 13, when the liquid fuel nozzle needle 9 lifts away from the valve seat 15. For injection operation, a liquid fuel pressure level may amount e.g. to 2200 bar or more.

The nozzle body 7 furthermore comprises a second module 19 or second part which surrounds the first module 11 over a portion, forming the nozzle body 7. The second module 19 is here formed as a ring body and accommodates a number of gas nozzle needles 21—in the present case for example, four gas nozzle needles 21—which are distributed in the circumferential direction A about the liquid fuel nozzle needle 9, here arranged centrally, or the first module 11 arranged inside the ring body 19.

As an alternative to such an arrangement in which the liquid-fuel nozzle needle 9 is surrounded by "satellite" gas nozzle needles 21, the invention may also be provided with an injector configuration in which one or more gas nozzle needles 21 are arranged axially parallel with the liquid-fuel nozzle needle 9 in one or a single plane, e.g. adjacent thereto on one or both sides.

With the fuel injector 3 according to the invention, furthermore a gas nozzle assembly 23 is assigned to each gas nozzle needle 21 at a nozzle end 25 of the fuel injector 3 or nozzle body 7, i.e. at the second module 19, wherein each gas nozzle assembly 23 comprises at least one, in the present case for example three, gas nozzle openings 27. The gas nozzle openings 27—like the spray holes 17 of the first module 11—are preferably each formed as a drilling channel, in particular rounded on the inlet side, for example by means of flow grinding. As part of the present invention, it is provided that the fuel injector 3 has for example four gas nozzle assemblies 23 corresponding to the four gas nozzle needles 21 and each comprising three gas nozzle openings 27.

In general, with the invention, it is provided that one or more gas nozzle openings 27 of a respective nozzle assembly 23 are distributed only over part of the circumference in the circumferential direction A, i.e. only over a portion of 360°.

Figure 2:
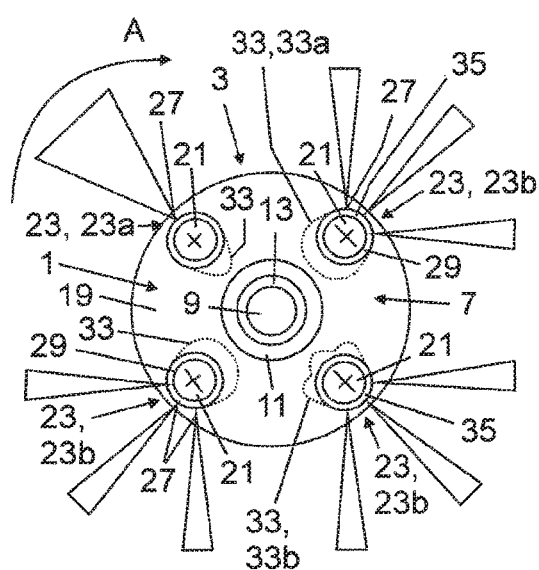

FIG. 2 illustrates in cross-section, as a top view from above with a combustible gas jet depicted diagrammatically as a triangle, an exemplary fuel injector 3 according to the invention which—as explained above—has a modular nozzle body 7, wherein the first module 11 with the liquid fuel nozzle needle 9 is arranged centrally in the second module 19. The drawing furthermore shows as an example four nozzle assemblies 23, wherein one nozzle assembly 23a is illustrated as an example and comprises for example only one gas nozzle opening 27, but also shows as examples nozzle assemblies 23b which each have three gas nozzle openings 27. The gas nozzle openings 27 of a respective gas nozzle assembly 23 shown here, in accordance with the invention, are each arranged only over part of the circumference around the assigned gas nozzle needle 21. For example and preferably, with a fuel injector 3 which has four gas nozzle needles 21 and in which the gas nozzle needles 21 are arranged preferably with a spacing of 90° in the circumferential direction A of the nozzle body 7, a gas nozzle assembly 23 is provided such that three gas nozzle openings 27 are evenly distributed over a range of 90° in the circumferential direction A. With an arrangement of four gas nozzle needles 21, it is therefore clear—see for example FIG. 2—that a good 360° coverage can be achieved in the context of combustible gas emission.

Now in particular, again with reference to FIG. 1, in the same way as the liquid fuel injector part described above, a respective gas nozzle needle 21 is received in an associated axial holder 29 so that its stroke is controllable. The axial holder 29, which in particular also guides the respective gas nozzle needle 21, may at least in portions be formed as an axial bore, i.e. formed in the nozzle body 7 or in the second module 19. A respective gas nozzle opening 27 opens from the holder 29 at a respective nozzle end with a radial direction component, in particular a clearly pronounced radial direction component, e.g. inclined by an angle of 10° to 30° in relation to a center axis B.

As for the liquid fuel nozzle needle 9, for a respective gas nozzle needle 21, a needle seat 31 or (nozzle) valve seat is formed in the associated holder 29, i.e. upstream of or above (further away from the nozzle) the respective at least one gas nozzle opening 27. The needle seat 31 which, in the context of the invention, is formed preferably adjacent to or directly next to the at least one gas nozzle opening 27 (upstream; viewed in the axial direction), is provided to selectively block, in cooperation with the gas nozzle needle 21, a combustible gas flow path to the respective gas nozzle opening 27. On lifting of the gas nozzle needle 21 away from the needle seat 31, the flow path leads from a portion of the holder 29 arranged upstream in respect to the needle seat 31, over the needle seat 31 to the at least one gas nozzle opening 27. Here, in the upstream portion of the holder 29, combustible gas may be introduced via a high-pressure line of the fuel injector 3 (not shown) for the emission of combustible gas during injector operation, for example with a pressure level of 350 bar or more.

To control the stroke of the fuel injector nozzle needles 9, 21 during an injector operation, in particular of both the gas nozzle needles 21 and the liquid fuel nozzle needle 9, preferably an indirect control principle is provided wherein the nozzle needles 9, 21 are controlled in particular hydraulically, i.e. in particular following the known principle of actuator, pilot valve, control chamber. The control fluid here is preferably the liquid fuel supplied to the fuel injector 3.

In order to achieve the advantages outlined above of an optimized flow guidance of combustible gas to the gas nozzle openings 27 distributed only over part of the circumference in the circumferential direction A, the fuel injector 3 according to the invention is furthermore configured such that a respective holder 29 is formed adjacent to the needle seat 31 and extending axially away therefrom in the upstream direction, asymmetrically relative to the axial center axis B through the gas nozzle needle 21, see for example FIG. 1.

Here, the asymmetry results from a cross-section widening 33 of the holder 29 at a side of the holder 29 radially opposite the at least one gas nozzle opening 27 (which cross-section widening 33 is shown as an example, e.g. by the dotted lines in FIG. 2 which depict possible e.g. oval cross-sections of the cross-section widening), so that a greater mass flow of combustible gas can be guided by the cross-section widening 33 than at the side 35 opposite the gas nozzle opening. With the cross-section widening 33 for example, a mass flow division of ⅓ to ⅔ can be achieved between the gas nozzle opening side 35 and the side of the cross-section widening 33 radially opposite the gas nozzle openings 27. As the inventors have found, by means of the clear space above the needle seat 31 provided by the asymmetrical cross-section widening 33, it is advantageously possible to significantly reduce flow losses.

In the context of the invention, it should also be noted that the respective receiver 29 is formed so as to apply to a combustible gas flow C, guided by means of the cross-section widening 33 to the needle seat 31, even upstream of the needle seat 31 and by means of the cross-section widening 33, a flow direction being oriented towards the radially opposite at least one gas nozzle opening 27, in particular by means of a suitably formed outlet end 37 of the cross-section widening 33. For a streamlined guidance of combustible gas at the needle seat 31 and for application of the flow direction, the cross-section widening 33 on the outlet side or adjacent to the needle seat 31 is preferably formed arcuate or curved as a dish, e.g. forming a parabolic surface, or generally rounded.

As reference sign 33a in FIG. 2 designates, with the invention it may be provided that a respective cross-section widening 33a formed opposite a gas nozzle opening 27 may be merged with an adjacent cross-section widening 33a of a further gas nozzle opening 27 in order to form a common cross-section widening 33, in particular spanning an arcuate, enveloping cross-section. Alternatively however, it may also be provided—see reference 33b in FIG. 2—for a respective gas nozzle opening 27 to provide a cross-section widening 33 which can be identified as an independent cross-section widening 33b, and which e.g. may also be formed as a chute directed towards the corresponding gas nozzle opening 27, each spanning a separate arcuate cross-section.

In particular with reference to FIGS. 3 to 12, further aspects of possible embodiments of the fuel injector 3 according to the invention will be discussed below.

Figure 3:
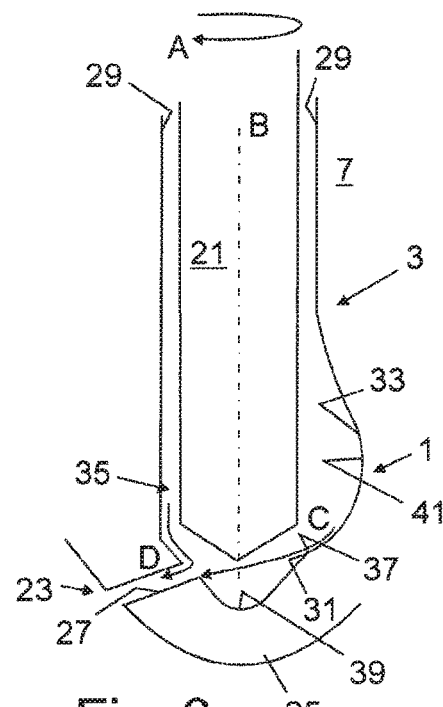

FIG. 3 illustrates a partial view of a fuel injector 3 in which a gas nozzle needle 27 is held in an asymmetric holder 29 configured according to the invention, wherein a nozzle end of the holder 29 forms a blind hole 39. The needle seat 31, formed with a chamfered seat face or as a conical seat, is formed directly above the gas nozzle openings 27, wherein on lifting of the gas nozzle needle 21, a line of sight is possible from the outlet end 37 of the cross-section widening 33 to the inlet cross-section of the gas nozzle opening 27 arranged radially opposite thereto. Here, with the cross-section widening 33 formed as a bulge 41 on the holder 29, a direction component may be applied to a combustible gas flow C flowing over the outlet end 37 of the cross-section widening 33, which direction component is suitable for guiding the combustible gas by means of the cross-section opening 33, as far as possible tangentially (in relation to the inlet direction of the gas nozzle opening 27) or axially parallel to the center axis of the gas nozzle opening 27, onto or into the at least one gas nozzle opening 27, in particular at the inlet end thereof close to the combustion chamber, i.e. so that a combustible gas inlet with little disruption is possible. FIG. 3 furthermore illustrates a combustible gas flow D which is guided to the gas nozzle opening 27 on the gas nozzle opening side 35.

Figure 4:
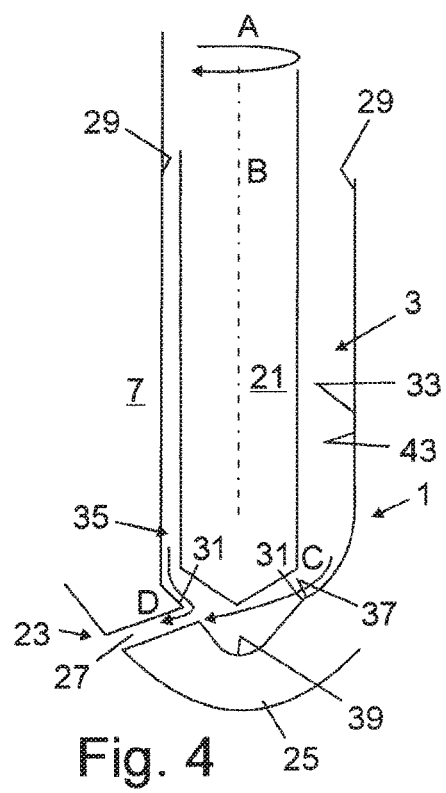

FIG. 4 shows a view of a fuel injector 3 formed in the same way as in FIG. 3, wherein the asymmetry of the holder 29—in contrast to FIG. 3—is formed not by cross-section widening 33 in the form of a bulge 41, but by a cross-section widening 33 which, starting from the nozzle-side arcuate form, continues with constant (maximum) cross-section 43 in the direction towards an injector end remote from the nozzle. In this way, the volume at the side opposite the gas nozzle openings 27 is further increased.

Figure 5:
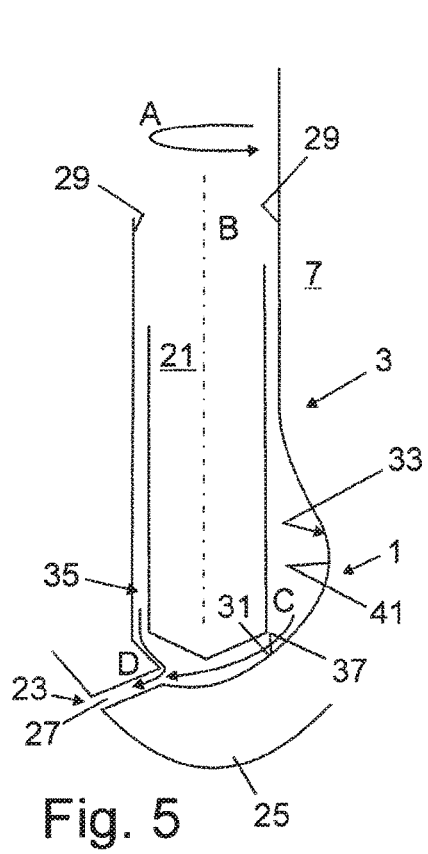

FIG. 5 shows a configuration of a fuel injector 3 with further improved inlet properties. In this embodiment in which the fuel injector 3 has substantially no blind hole, an inlet face of the needle seat 31 adjacent to the cross-section widening 33 aligns with the outlet face 37 of the cross-section widening 33 adjacent to the needle seat 31, in a flow-favorable manner. Here, the needle seat 31 forms a chamfered seat face which also continues the cross-section widening 33 substantially with the applied flow direction. In this embodiment too, advantageously—as mentioned above—a line of sight is established on lifting of the gas nozzle needle 21 from needle seat 31, so as to largely avoid any influencing, harmful to the flow, of the combustible gas flow guided from the cross-section opening 33 towards the radially opposite at least one gas nozzle opening 27, by immersion of the gas nozzle needle 21 therein.

Figure 6:
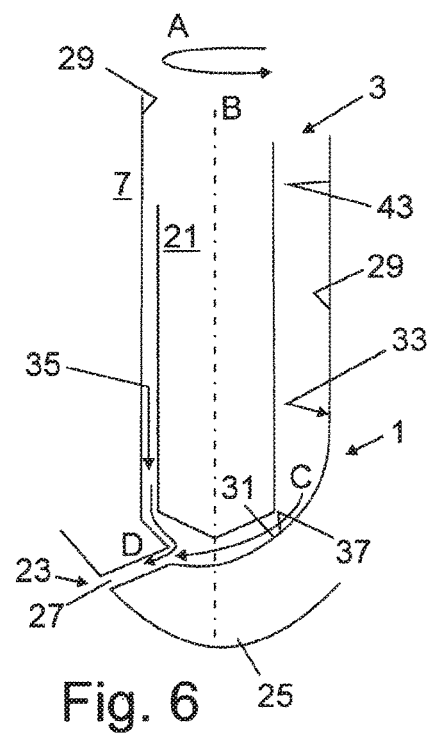

FIG. 6 illustrates a fuel injector 3 according to FIG. 5, wherein the cross-section widening 33 again is formed not as a bulge 41 but, in contrast, with a cross-section 43 which is constant in portions, similarly to FIG. 4.

Figure 7:
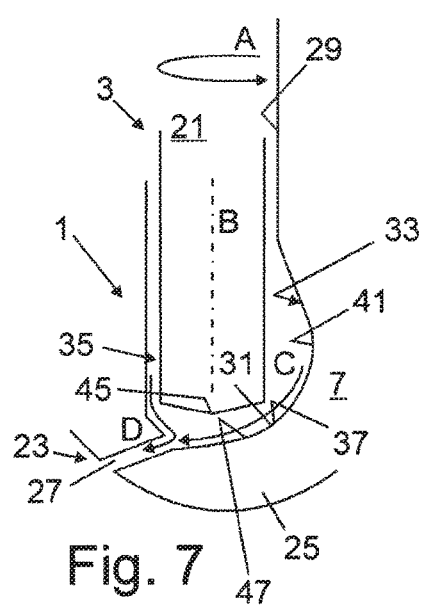

FIG. 7 now illustrates a fuel injector 3 in which the gas nozzle needle 21 is flattened at a nozzle end 45 in comparison with the embodiments explained above in relation to FIGS. 3 to 6, so that the flow disruption by deflection around the end 45 of the gas nozzle needle 21 is further minimized. Flattening of the gas nozzle needle 21 may also allow a streamlined stepped fall 47, leading from the outlet end 37 of the cross-section widening 33 to the inlet cross-section of the at least one gas nozzle opening 27 formed radially opposite thereto, which stepped fall 47 has a constant incline or slope and leads as tangentially as possible, or substantially tangentially, to the gas nozzle opening 27. As in the embodiments in FIGS. 5 to 6, the holder 29 is here formed to guide a combustible gas flow, guided by the cross-section widening 33 to the needle seat 31 and over this to the at least one gas nozzle opening 27, along this flow path portion without stepped falls, in particular with the applied flow direction.

Here again, the desired line of sight is created on lifting of the gas nozzle needle 21.

Figure 8:
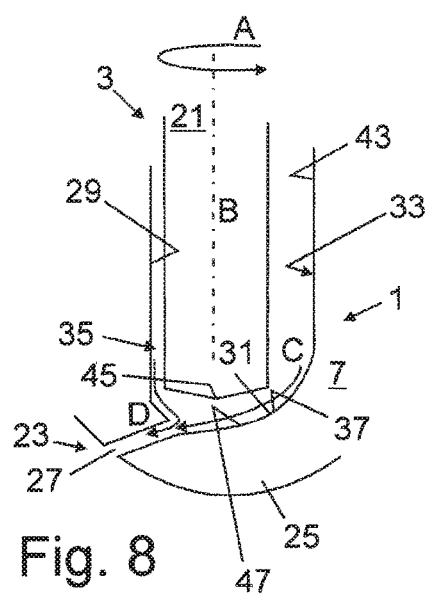

FIG. 8 shows a fuel injector 3 with a cross-section widening 33 formed similarly to FIG. 4 or FIG. 6.

FIG. 9 now illustrates a fuel injector 3 in which the gas nozzle needle 21 is also formed asymmetrically at its nozzle-side end 45. Here, the flow-conductive chamfered face 49a at the gas nozzle opening side 35 of the gas nozzle needle 21 is shortened in its radial extension in comparison with the opposite flow-conductive chamfered face 49b, along which the combustible gas flow C is guided which flows on the side of the cross-section widening 33. In this way, the combustible gas flow C flowing on the side of the cross-section widening 33 is guided right to the inlet cross-section of the gas nozzle opening 27 formed opposite thereto, and thus combined with the further combustible gas flow D at the gas nozzle opening side 35 only immediately before entering the gas nozzle opening 27, so that flow disruption arising from the combining of part flows C, D is further minimized. In this embodiment, a twist protection 51 is provided, which for example may be implemented with a tongue-and-groove connection, and holds the gas nozzle needle 21 in the specified rotational position shown.

FIG. 10 shows an embodiment according to FIG. 9 with the difference that the cross-section widening 33, similarly to FIGS. 4, 6 and 8, continues with maximum cross-section 43 over a portion towards the upstream end of the fuel injector 3.

FIG. 11 now illustrates a further preferred embodiment of the fuel injector 3 which in particular is based on an embodiment of the fuel injector in FIGS. 9 and 10, and in which, at the side radially opposite the at least one gas nozzle opening 27, the gas nozzle needle 21 has a flow-conductive molding 53 in the form of a bulge which is received in the cross-section widening 33. Here the molding 53, which provides a partially rounded end portion on the gas nozzle needle 21, is suitable in particular for guiding the combustible gas flow C in a streamlined fashion around the end portion of the gas nozzle needle 21 on the side of the cross-section widening.

FIG. 12 again shows an embodiment according to FIG. 11 with the difference that the cross-section widening 33, similarly to FIGS. 4, 6, 8 and 10, continues with maximum cross-section 43 over a portion towards the upstream end of the fuel injector 3.

Finally, it should be noted that, evidently, also the embodiments according to FIGS. 9 to 12 may provide a line of sight as described above on lifting of the gas nozzle needle 21, wherein the embodiments according to FIGS. 11 and 12 constitute extremely streamlined solutions.

LIST OF REFERENCE SIGNS

1 Nozzle-side end portion
3 Fuel injector
5 Injector housing
7 Nozzle body
9 Liquid fuel nozzle needle
11 First module
13 Axial bore
15 Valve seat
17 Spray hole
19 Second module
21 Gas nozzle needle
23 Gas nozzle assembly
23*a* Gas nozzle assembly
23*b* Gas nozzle assembly
25 Nozzle end
27 Gas nozzle opening
29 Holder
31 Needle seat
33 Cross-section widening
33*a* Cross-section widening
33*b* Cross-section widening
35 Gas nozzle opening side
37 Outlet end
39 Blind hole
41 Bulge
43 Cross-section
45 End
47 Stepped fall
49*a* Chamfered face
49*b* Chamfered face
51 Twist protection
53 Molding
A Circumferential direction
B Center axis
C Combustible gas flow with applied flow direction
D Combustible gas flow

The invention claimed is:

1. A fuel injector for operation with combustible gas, comprising:
   at a nozzle end, a gas nozzle assembly having at least one gas nozzle opening;
   at least one gas nozzle needle assigned to the gas nozzle assembly and accommodated in an axial holder so that a stroke of the needle is controllable, wherein each gas nozzle opening leads out of the holder at the nozzle end with a radial direction component; and
   a needle seat arranged in the holder upstream of the respective gas nozzle opening, the needle seat being provided for selectively blocking, in cooperation with the gas nozzle needle, a combustible gas flow path to the respective gas nozzle opening, wherein the at least one gas nozzle opening is distributed merely over part of a circumference in a circumferential direction of the gas nozzle needle, wherein the holder, adjoining the needle seat and extending axially away therefrom in an upstream direction, is formed asymmetrically with respect to an axial center axis through the gas nozzle needle, wherein the asymmetry results from a cross-section widening of the holder on a side of the holder lying radially opposite the at least one gas nozzle opening, such that the cross-section widening permits a greater mass flow of combustible gas in the holder than on a gas nozzle opening side opposite thereto, wherein the holder is also configured to apply a flow direction, oriented towards a radially opposite at least one gas nozzle opening, upstream of the needle seat and by way of the cross-section widening, to a combustible gas flow guided to the needle seat by the cross-section widening.

2. The fuel injector according to claim 1, wherein the needle seat forms a chamfered seat face which continues the cross-section widening with the applied flow direction; and/or an inlet face of the needle seat adjoining the cross-section widening aligns with an outlet face of the cross-section widening adjoining the needle seat.

3. The fuel injector according to claim 1, wherein the holder is configured to guide a combustible gas flow, which is conducted by the cross-section opening to the needle seat and over the needle seat to the at least one gas nozzle opening, along this flow path portion without stepped falls, continuously with the applied flow direction.

4. The fuel injector according to claim 1, wherein the holder is configured to guide combustible gas with the applied flow direction tangentially to the at least one gas nozzle opening.

5. The fuel injector according to claim 4, wherein the holder is configured to guide the combustible gas tangentially to an inlet end of the at least one gas nozzle opening.

6. The fuel injector according to claim 1, wherein the cross-section widening is formed as a bulge on the holder; and/or the holder forms at least one chute that guides the combustible gas flow by way of the cross-section widening to the at least one gas nozzle opening.

7. The fuel injector according to claim 1, wherein the gas nozzle needle has a nozzle-side end portion formed asymmetrically in relation to the axial center axis of the gas nozzle needle, so that the end portion causes a combustible gas flow, guided by the cross-section widening to the at least one gas nozzle opening, to be combined with a combustible gas flow on the gas nozzle opening side only immediately before the inlet end of the gas nozzle opening, and/or be guided tangentially to the gas nozzle opening; and/or the gas nozzle needle has a greater axial length adjacent to the at least one gas nozzle opening than at a side radially opposite thereto.

8. The fuel injector according to claim 1, wherein the gas nozzle needle has, on a side radially opposite the at least one gas nozzle opening, a flow-conductive molding and/or a bulge received in the cross-section widening, wherein the molding is configured to guide the combustible gas flow, guided by way of the cross-section widening, around the end portion of the gas nozzle needle in a streamlined fashion.

9. The fuel injector according to claim 1, wherein the gas nozzle needle is held in the holder so as to be secure against twisting.

10. The fuel injector according to claim 1, wherein the gas nozzle assembly has a plurality of gas nozzle openings, wherein the gas nozzle openings are distributed over part of the circumference in the circumferential direction in an angular range of 80° to 100°.

11. The fuel injector according to claim 1, wherein the gas nozzle assembly has a plurality of gas nozzle openings, wherein the gas nozzle openings are distributed over part of the circumference in the circumferential direction in an angular range of 160° to 200°.

12. The fuel injector according to claim 1, wherein the fuel injector is configured to allow a line of sight from the outlet end of the cross-section widening to an inlet cross-section of the at least one gas nozzle opening arranged radially opposite thereto upon lifting of the gas nozzle needle away from the needle seat.

13. The fuel injector according to claim 12, wherein the line of sight is from the outlet end of the cross-section widening to a lower end of the inlet cross-section of the at least one gas nozzle opening arranged radially opposite thereto.

14. The fuel injector according to claim 1, wherein the fuel injector is a dual-fuel injector that can also be operated with liquid fuel.

15. An internal combustion engine, comprising at least one fuel injector according to claim 1.

* * * * *